Patented Oct. 7, 1947

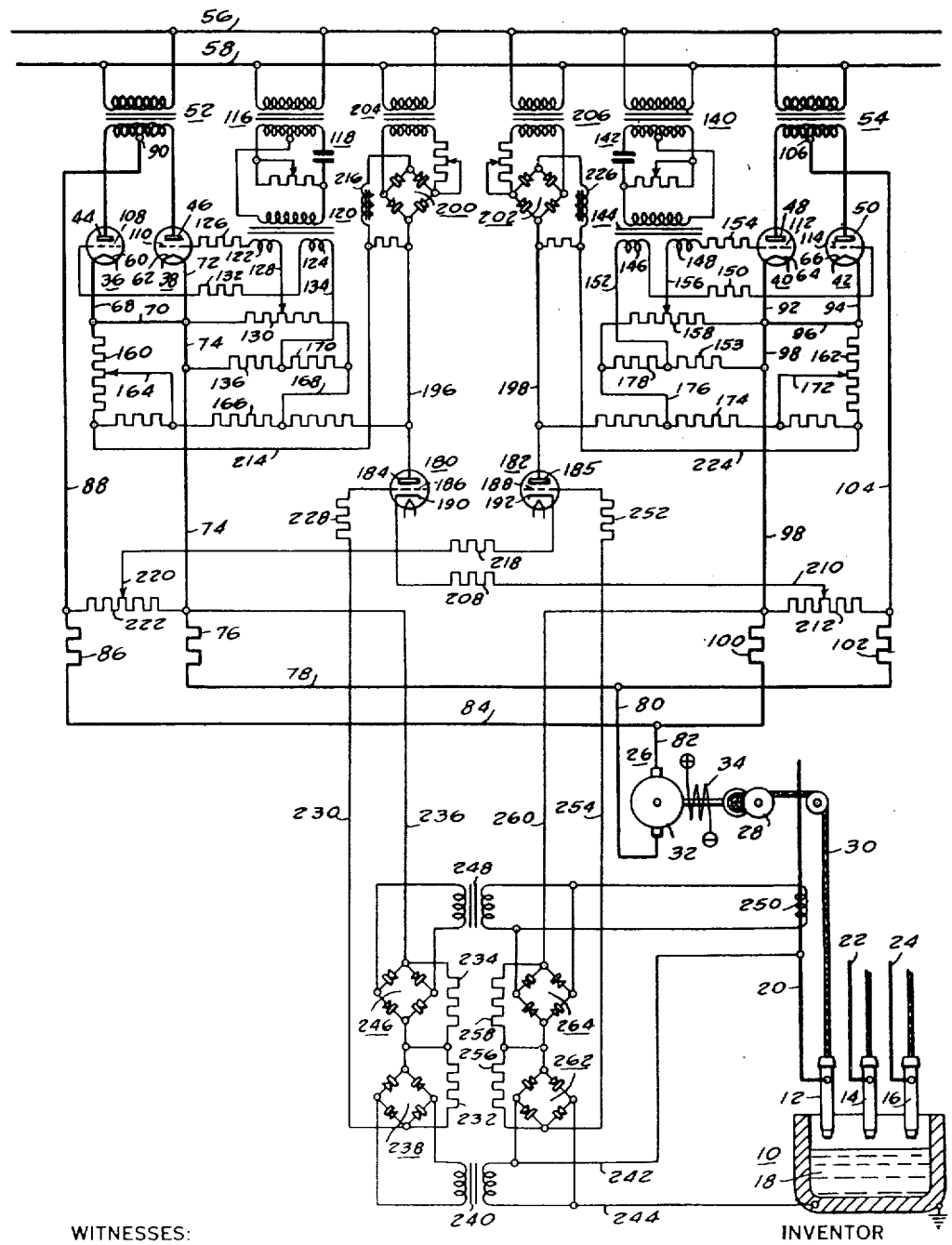

2,428,583

UNITED STATES PATENT OFFICE 2,428,583

ELECTRICAL MOTOR CONTROL SYSTEM

Jack E. Reilly, Wilkinsburg, Pa., assignor to Westinghouse Electric Corporation, East Pittsburgh, Pa., a corporation of Pennsylvania Application June 16, 1945, Serial No. 599,837

5 Claims. (Cl. 172—239)

This invention relates to electrical systems and in particular to arc furnace regulating systems.

An object of this invention is to provide in an electronic arc furnace regulating system, for automatically limiting the current flow to the electrode motor to protect the electric valves utilized in controlling the operation of the motor.

Another object of this invention is to provide an electronic control system for a reversible motor whereby the flow of current to the motor is limited to protect the electric valves utilized in the system.

Other objects of this invention will become apparent from the following description when taken in conjunction with the accompanying drawing the single figure of which is a diagrammatic view of the apparatus and circuits of an arc furnace regulating system embodying the teachings of this invention.

Referring to the drawing this invention is illustrated by reference to an arc furnace 10 having electrodes 12, 14 and 16 disposed therein to be positioned with respect to a metal charge 18. The electrodes 12, 14 and 16 are connected by conductors 20, 22 and 24, respectively, to a source of supply (not shown). Since the control system and apparatus utilized in positioning each of the electrodes is the same, only the system and apparatus associated with electrode 10 is illustrated, it being understood that similar control systems are to be provided for the other electrodes.

As illustrated, a reversible motor 26 is utilized for positioning the electrode 12, the electrode 12 being connected to be raised or lowered by operation of the motor. For this purpose a winding drum 28 is disposed to be driven by the motor 10, a flexible cable 30 being connected to the electrode 12 and disposed to be wound upon the drum 28. The motor comprises an armature winding 32 and a field winding 34, the field winding being disposed to be separately excited from a source of supply (not shown).

In order to control the direction and speed of operation of the motor 26, two sets of electric valves such as the thyratron tubes 36—38 and 40—42 are utilized. The valves 36, 38, 40 and 42 are provided with anodes 44, 46, 48 and 50, respectively, connected to the terminals of the secondary windings of transformers 52 and 54 as illustrated, the primary windings of which are connected across supply conductors 56 and 58. The valves 36, 38, 40 and 42 are also provided with cathodes 60, 62, 64 and 66, respectively, the cathodes 60 and 62 being connected through conductors 68—70 and 72, respectively, to conductor 74, through resistor 76, conductors 78 and 80, armature winding 32, conductors 82 and 84, resistor 86 and conductor 88 to the center tap 90 of the secondary winding of transformer 52. In a similar manner the cathodes 64 and 66 are connected by conductors 92 and 94—96, respectively, to conductor 98, through resistor 100, conductors 84 and 82, armature winding 32, conductors 80 and 78, resistor 102 and conductor 104 to the center tap 106 of the secondary winding of transformer 54.

The valves 36, 38, 40 and 42 are also provided with grids 108, 110, 112 and 114, respectively. The grids 108 and 110 are supplied with an alternating-current potential from the supply conductors 56 and 58 through a transformer 116, a phase-shifting circuit 118 and a grid transformer 120. The secondary winding of the grid transformer comprises two sections 122 and 124, the winding 122 having one end connected through a resistor 126 to the grid 110 and the other end connected through a conductor 128, a part of resistor 130 and the conductor 72 to the cathode 62 of valve 38 whereas the winding 124 has one end connected through resistor 132 to the grid 108 and the other end connected through conductor 134, resistor 136 and conductors 74, 70 and 68 to the cathode 60 of the valve 36.

Likewise, an alternating-current potential is supplied to the grids 112 and 114 of valves 40 and 42, respectively, from supply conductors 56 and 58 through transformer 140, the phase-shifting circuit 142 and the grid transformer 144 which is provided with two secondary windings 146 and 148. The winding 146 has one end connected through resistor 150 to the grid 114 of valve 42, the other end of winding 146 being connected through conductor 152, resistor 153 and conductors 98, 96 and 94 to the cathode 66. The secondary winding 148 is also connected at one end through resistor 154 to the grid 112 of valve 40, the other end being connected through conductor 156, a part of resistor 158 and conductor 92 to the cathode 64.

Potentiometer resistors 160 and 162 are disposed in circuit relation with the grids 108—110 and 112—114, respectively, of the discharge valves 36—38 and 40—42, respectively, for controlling the grid-cathode potential of the valves in a predetermined manner. Thus one end of the resistor 160 is connected through conductors 68 and 70—72 to cathodes 60 and 62, respectively, and a flexible lead 184 connected to an intermediate tap of resistor 160 is connected through resistor 166, conductor 168, resistor 170 and conductor 134 to the secondary winding 124, the conductor 168 also being connected through a part of resistor 130 and conductor 128 to the secondary winding 122 of the grid transformer 120. In the same manner one end of resistor 162 is connected through conductors 94 and 96—92 to the cathodes 66 and 64, respectively, of valves 42 and 40, respectively, and a flexible lead 172 connected to an intermediate tap of resistor 162 is connected through resistor 174, conductor 176, resistor 178 and conductor 152 to the secondary winding 146, the conductor 176 also being connected through a part of resistor 158 and conductor 156 to the secondary winding 148 of transformer 144.

In order to control the direct-current biasing potential for the discharge valves 36—38 and 40—42, vacuum type discharge valves 180 and 182, respectively, are provided being disposed to control the current flow through the potentiometer resistors 160 and 162, respectively. The valves 180 and 182 comprise anodes 184 and 185, respectively, grids 186 and 188, respectively, and cathodes 190 and 192, respectively. The anodes 184 and 185 are connected by conductors 196 and 198, respectively, to an output terminal of associated rectifiers 200 and 202, respectively, which are supplied from transformers 204 and 206, respectviely, the primary windings of the transformers being connected across supply conductors 56 and 57.

The cathode 190 of discharge valve 180 is connected through a self-biasing resistor 208, a flexible lead 210 connected to an intermediate tap of a resistor 212, resistor 102, conductor 78, resistor 76, conductors 74 and 70, potentiometer resistor 160, conductor 214 and a smoothing reactor 216 to the other output terminal of the rectifier 200. In a similar manner, the cathode 192 of valve 182 is connected through a self-biasing resistor 218, a flexible lead 220 connected to an intermediate tap of a resistor 222, resistor 86, conductor 84, resistor 100, conductors 98 and 96, potentiometer resistor 162, conductor 224 and a smoothing reactor 226 to the other output terminal of the rectifier 202.

In order to control the biasing potential of the grids 186 and 188 of the discharge valves 180 and 182, respectively, the grids 186 and 188 are connected so that their potential is controlled in response to the current flowing through the electrode 12 and the arc potential across the electrode arc. Thus the grid biasing circuit of the valve 180 extends from the grid 186 through a grid resistor 228, conductor 230, series connected resistors 232 and 234, conductor 236, resistor 76, conductor 78, resistor 102, a part of resistor 212, flexible lead 210 and self-biasing resistor 208 to the cathode 190.

The resistors 232 and 234 are control resistors and are disposed to have a direct-current voltage thereacross proportional to the arc potential and the flow of current through electrode 12, respectively. For this reason the resistor 232 is connected across a rectifier bridge 238 which is connected through a transformer 240, the terminals of the primary winding of which are connected by conductors 242 and 244 to supply conductor 20 and the receptacle of the grounded furnace 10, respectively. The control resistor 234 is also connected across a rectifier bridge 246 which is supplied by a transformer 248 connected to be energized by the current transformer 250 in accordance with the current flowing in conductor 20. The transformers 240 and 248 are preferably of a one-to-one ratio and are employed primarily to prevent sneak circuits or effects on the grid of the discharge valves 180 and 182.

As illustrated the rectifier bridges 238 and 246 are connected in opposition whereby the direct-current voltages across resistors 232 and 234 are of opposite polarity. Thus for any variation in the flow of current through the electrode and in the arc potential, the differential of the direct-current voltages across the series connected resistors 232 and 234 normally controls the direct-current biasing potential on the grid 186 of the discharge valve 180.

The grid 188 of the discharge valve 182 is likewise connected through a grid resistor 252, conductor 254, series connected resistors 256 and 258, conductor 260, resistor 100, conductor 84, resistor 86, a part of resistor 222, flexible lead 220 and the self-biasing resistor 218 to the cathode 192. The control resistor 256 is connected across a rectifier bridge 262 the input terminals of which are connected by conductors 242 and 244 to the supply conductor 20 and the receptacle of the grounded furnace 10, respectively, whereby a direct-current voltage proportional to the arc potential is impressed across resistor 256. The control resistor 258 is also connected across a rectifier bridge 264, the input terminals of which are connected across the current transformer 250 on the conductor 20 whereby the direct-current voltage impressed across resistor 258 is proportional to the current flowing through the electrode 12. The rectifier bridges 262 and 264 are so connected across the resistors 256 and 258, respectively, that the direct-current voltages impressed thereacross are of opposite polarity for normally controlling the direct-current biasing potential of the grid 188 of the valve 182.

In the system described, the resistors 208 and 218 are selected so as to assure a negative bias on the grids of the valves 180 and 182, respectively, when the electrode 12 is in an ideal or balanced operating position and the direct-current voltages across the control resistors are so balanced that the differentials of the direct-current voltages are substantially zero. The resistors 160 and 162 in the circuits with the sets of discharge valves 36—38 and 40—42, respectively, are so adjusted by adjusting the flexible leads 164 and 172, respectively, that the drop across the section of the resistors 160 and 162 in circuit with the grids of the valves 36—38 and 40—42, respectively, gives a sufficient dead zone to prevent simultaneous firing of both sets of the discharge valves.

The resistors 76 and 100 in the motor armature circuits controlled by the firing of valves 36—38 and 40—42, respectively, are also connected in the grid circuits of the valves 180 and 182, respectively, and function to automatically limit the starting current of the motor to a safe value for the valves 36—38 and 40—42. In addition to limiting the starting current of the motor, the resistors 76 and 100 also function to protect the valves 36—38 and 40—42, respectively, from any overload on the system by so controlling the grid bias of the valves that the current flow to the motor is within the safe current limits of the valves. The specific manner in which such protection is obtained will be fully explained hereinafter in connection with the operation of the system.

In operation, assuming that the system is energized, the electrodes 12, 14 and 16 are positioned with respect to the metal charge 18 in the furnace by a manual or automatic manipulation (not shown) of the electrodes, such positioning and methods of doing so being well known in the art. Assuming that the initial positioning of the electrodes is to be obtained automatically, as soon as the system is energized and conductors 20, 22 and 24 are connected to a source of power supply, a potential exists from the electrode 12 to the metal 18 in the furnace. This potential is at a maximum and since the electrodes 12, 14 and 16 are not as yet adjusted, there is no current flow. The high value of the arc potential impresses a high value of direct-current voltage across each of the control resistors 232 and 256, and since current is not flowing through the electrode 12, the direct-current voltages across resistors 234 and 258 proportional to the flow of current are zero. The direct-current voltage across control resistor 232 places a large negative bias on the grid 186 of valve 180 whereas the direct-current voltage across control resistor 256 places a less negative or more positive bias on the grid 188 of valve 182.

The bias thus impressed on the grid 188 is such that the valve 182 is rendered more conductive with the result that current flows from the negative terminal of rectifier bridge 202, through reactor 226, conductor 224, potentiometer resistor 162, conductors 96 and 98, resistor 100, conductor 84, resistors 86 and 222, flexible lead 220, self-biasing resistor 218, cathode 192 and anode 185 of valve 182 and conductor 198 to the positive terminal of the supply rectifier bridge 202. Since the direct-current voltage proportional to the arc potential is at a maximum, the conductivity of the valve 182 is also a maximum and maximum current flows through the potentiometer resistor 162. The flow of current through resistor 162 renders the direct-current biasing potential on the grids 112 and 114 of valves 40 and 42, respectively, more negative whereby the grid-cathode potential of the valves is lowered and maintained at a potential below the critical potential of the valves and the valves 40 and 42 are blocked with the result that no current flows therethrough to the motor 26.

At the same time, the large direct-current voltage proportional to the arc potential impressed across control resistor 232 cooperates with the self-biasing resistor 208 to impress a more negative biasing potential on the grid 186 to decrease the conductivity of valve 180. Thus the current flow through potentiometer resistor 160 in the anode-cathode circuit of valve 180 is so decreased that the direct-current biasing potential for the valves 36 and 38 is so reduced that the resultant grid-cathode potential of valves 36 and 38 rises above the critical potential of the valves and they become highly conductive to pass current to the motor 26. This conducting circuit extends from the center tap 90 of the secondary winding of transformer 52 through conductor 88, resistor 86, conductors 84 and 82, armature windings 32 of the motor 26, conductors 80 and 78, resistor 76, conductor 74, the parallel conductors 70—68 and 72 to cathodes 60 and 62, respectively, of valves 36 and 38, anodes 44 and 46, respectively, and from thence to the terminals of the secondary winding of transformer 52, to so energize the motor 26 as to effect the operation thereof in a direction to lower the electrode 12. Since the other electrodes 14 and 16 are as yet not in contact with the metal bath 18, the electrode 12 is lowered to a position where it engages the metal 18.

As the electrode 12 is lowered the potential between the electrode 12 and the metal 18 decreases with the result that the direct-current voltage across resistors 232 and 256 is so decreased that the bias on the grids of valves 180 and 182 is rendered less negative and more negative, respectively. By rendering the biasing potential of the grid of valve 182 more negative the current flowing through the resistor 162 for controlling the biasing potential of the valves 40 and 42 more nearly approaches the value where the discharge devices 40 and 42 can be rendered conductive.

As soon as the electrodes 12, 14 and 16 are actuated to a position where a circuit is completed through the electrodes in conjunction with the metal 18, maximum current flows through the electrode 12 and a direct-current voltage proportional to the current is imposed across each of the control resistors 234 and 258 with the result that the differential of the direct-current voltages across resistors 232—234 and 256—258 is such as to place a less negative bias on the grid of valve 180 and a more negative bias on the grid of valve 182.

The less negative or more positive bias on the grid 186 of valve 180 renders the valve more conducting so that more current flows through the circuit extending from the negative terminal of the supply rectifier bridge 200 through the reactor 216, conductor 214, potentiometer resistor 160, conductors 70 and 74, resistor 76, conductor 78, resistors 102 and 212, flexible lead 210, self-biasing resistor 208, cathode 190 and anode 184 of valve 180, and conductor 196 to the positive terminal of the rectifier bridge 200. The current flowing through that part of potentiometer resistor 160 in the grid-cathode circuit of valves 36 and 38 renders the direct-current biasing potential on the grids 108 and 110, respectively, more negative to block the firing of the valves 36 and 38 and prevent the flow of current therethrough to the motor 26.

At the same time that valve 180 becomes conducting, the change in the biasing potential on the grid 188 of valve 182 is such as to decrease the current passed by the valve 182 with the result that the current flow through the potentiometer resistor 162 is so decreased or becomes zero, that the direct-current biasing potential on the grids 112 and 114 of valves 40 and 42, respectively, becomes less negative or more positive, and the valves 40 and 42 become conducting to pass current to the motor 26. The motor circuit thus established extends from the center tap 106 of the secondary winding of transformer 54 through conductor 104, resistor 102, conductors 78 and 80, armature windings 32 of the motor 26, conductors 82 and 84, resistor 100, conductor 98, the parallel conductors 92 and 96—94, cathodes 64 and 42, respectively, and anodes 48 and 50, respectively, of valves 40 and 42, respectively, to the terminals of the secondary winding of the transformer 54 to so energize the motor 26 as to effect an operation thereof in a direction to raise the electrode 12.

The electrode 12 is thus raised to a position for ideal operation of the arc furnace, in which position the direct-current voltage across each of control resistors 232 and 256 and which is proportional to the arc potential, and the direct-current voltage across each of resistors 234 and 258 and which is proportional to the current flowing through the electrode 12, are balanced and a zero differential appears across the series connected resistors 232—234 and the series connected resistors 256—258. Under such conditions the self-biasing resistors 208 and 218 function to maintain sufficient bias on the grids of valves 180 and 182, respectively, whereby they are sufficiently conducting to pass sufficient current through potentiometer resistors 160 and 162, respectively, that the direct-current biasing potential on the grids of valves 36—38 and 40—42, respectively, is sufficient to block the valves from passing current to the motor 26.

If the ideal operating condition for the arc furnace 10 is changed in any manner whatsoever, the balance of the direct-current voltages across control resistors 232—234 and 256—258 is upset with the result that the bias on the grids of valves 180 and 182 is changed to effect an operation of the motor 26 in a predetermined manner to again establish the required balance between the current and potential across the arc. If, for example, the electrode 12 should come in contact with the metal 18 as by reason of a cave-in of the metal, the arc potential is reduced to a minimum and the current flowing through the electrode is a maximum with the result that the differential of the direct-current voltages across control resistors 232 and 234 is of such a polarity as to render the grid of valve 180 more positive and thereby render the valve 180 more conductive. As described hereinbefore, when the valve 180 is thus rendered more conducting the flow of current through potentiometer resistor 160 so changes the grid-cathode potential of valves 36 and 38 as to render them non-conducting.

At the same time, the differential of the control voltages across resistors 256 and 258 is such as to place a more negative bias on the grid of valve 182 to decrease the current flow through the valve 182. Under such conditions, the direct-current biasing potential on the valves 40 and 42 is such that the valves are rendered less negative and current flows therethrough to the motor 26 to cause its operation to raise the electrode 12.

During the operation of the system the resistors 76 and 100 function to automatically limit the current flowing to the motor 26, each of the resistors being of low ohmic value and being connected in the motor armature circuits. As illustrated the resistor 100 is also connected in the anode-cathode circuit of valve 182 whereas the resistor 76 is also connected in the anode-cathode circuit of valve 180.

When the motor 26 is at rest the series connected resistors 222, 86 and 100 carry no motor current and therefore they have no effect on the control of valve 182. Likewise the resistors 212, 102 and 76 in the anode-cathode circuit of valve 180 carries no motor current when the motor 26 is at rest. If then, the direct-current voltages across control resistors 232—234 and 256—258 become unbalanced, as for example, whereby the differential of the direct-current voltages is such as to cause a more negative voltage on the grid 188 of valve 182, the negative bias from the associated potentiometer resistor 162 impressed on the grids of valves 40 and 42 is reduced and the motor current flowing therethrough will tend to reach a high value when the motor 26 is started from rest.

Under such conditions, the current flowing through the armature windings 32 also flows through resistor 100 which is also connected in the grid circuit of valve 182. As the flow of current to the motor 26 through resistor 100 increases, the potential across resistor 100 is such as to apply a positive grid bias to the grid valve 182 to offset some of the negative grid bias impressed as a result of the differential of the direct-current voltages across control resistors 256 and 258 whereby the valve 182 becomes more conducting. As the valve 182 thus becomes more conducting, current flows through the potentiometer resistor 162 to effect a change in the grid bias of valves 40 and 42 to phase back the firing angle of the valves 40 and 42 to effectively reduce the motor voltage and current. The resistor 100 is so selected that the potential drop thereacross is only effective at motor currents of a predetermined high amplitude or value, for example, such as are encountered at starting from rest or the like, to render the valve 182 more conducting. At all values of motor current below the selected and predetermined value, the resistor 100 is ineffective for rendering the valve 182 more conducting.

The resistor 76 functions in the same manner to limit the motor current if the differential of the direct-current voltages across resistors 232 and 234 is such as to cause a more negative voltage on the grid 186 of valve 180 whereby the valves 36 and 38 are rendered conducting to pass current to the motor 26. Under such conditions the current flowing through armature windings 32 also flows through resistor 76 and where the motor current reaches a predetermined value, a positive grid bias from the resistor 76 is impressed on the grid of valve 180 to offset some of the negative grid bias impressed thereon by the differential of the control voltages to render the valve 180 more conducting. The flow of current through the potentiometer resistor 160 thus resulting effects a change in the bias of valves 36 and 38 to phase back the firing angle of the valves 36 and 38 to effectively reduce the motor voltage and current. The resistor 76 is selected in the same manner as resistor 100 so that the potential drop thereacross is only effective at motor currents of a predetermined high value approaching the safe value for the valves 36 and 38 in so offsetting the negative bias of the differential to cause the valve 180 to conduct. At all values of motor current below the predetermined value the positive biasing potential of resistor 76 is insufficient to overcome the negative biasing effect of the differential of the control voltage.

As will be apparent with the system connected as described, if the biasing potential of either of the sets 36—38 or 40—42 of valves becomes less negative, more current flows through the armature windings 32 of the motor 26, the increase in current effecting an increase in the speed of the motor. As the position of the electrode 12 is changed, the differential of control voltages across resistors 232—234 and 256—258 is changed to control the bias on the grids of discharge devices 180 and 182 whereby the bias on valves 36—38 and 40—42 is controlled to control the current passed to the motor 26. Thus as the bias of either set 26—28 or 40—42 becomes less positive the flow of current therethrough decreases to effectively slow the motor as the electrode 12 approaches a position where a predetermined balance is obtained between the arc current and arc potential.

The system of this invention is effective in affording protection for the valves controlling the flow of current to the motor and can readily be duplicated. Further, as the system utilizes standard parts it is apparent that the advantages of the system of this invention can readily be obtained without greatly adding to the investment of present systems.

I claim as my invention:

1. In a control system, in combination, a reversible motor the operation of which is to be controlled, a pair of valve means disposed to selectively connect the motor to a source of alternating current to control the direction of operation of the motor, the motor being normally disposed to coast when either of the valve means functions to disconnect the motor from the source, a control means for rendering the pair of valve means selectively conductive, a source of control voltage responsive to the operation of the control means, and means connected in circuit between each of the valve means and the motor to be responsive to the flow of motor current of a predetermined value to develop a predetermined potential of a predetermined polarity, said means also being connected in circuit between the source of control voltage and the control means and being disposed to effect an operation of the control means when the potential impressed thereon is of the predetermined value to control the valve means conducting current to the motor to maintain the flow of current at a value below a predetermined safe value for the valve means.

2. In a control system, in combination, a motor the speed of which is to be controlled, a pair of electric valves disposed to connect the motor to a source of current and to control the speed of the motor, the electric valves having grids to be utilized for controlling the conductivity thereof, a control circuit disposed for controlling the bias imposed on the grids, the control circuit including a resistor connected in circuit with the grids for controlling the bias thereof, means including a discharge valve having a control grid therein for supplying a current to the resistor, means comprising a source of control voltage variable in response to changes in the speed of the motor for impressing a variable bias on the control grid of the discharge valve, and a control resistor connected in circuit relation with the motor, source of control voltage and the discharge valve to be responsive to a predetermined flow of current through the motor to control the bias of the discharge valve and the pair of electric valves controlled thereby to maintain the flow of current to the motor at a predetermined safe value for the pair of electric valves.

3. In a control system for regulating the feeding of an electrode for producing and maintaining an electric arc, the combination comprising, a motor the speed of which is to be controlled, a pair of electric valves disposed to connect the motor to a source of current and to control the speed of the motor, the electric valves having grids to be utilized for controlling the conductivity thereof, a grid control circuit including a resistor for the electric valves, a discharge valve having a control grid therein to be utilized for controlling the flow of current through the resistor to control the bias of the grids of the pair of electric valves, a pair of sources of control voltages variable in opposite senses in response to electrical conditions of the arc for normally controlling the bias imposed on the grid of the discharge valve, and a control resistor connected in circuit relation with the motor, the pair of sources of control voltages and the discharge valve, the control resistor thereby being responsive to a predetermined flow of current through the motor to control the bias of the discharge valve and the pair of electric valves controlled thereby to maintain the flow of current to the motor at a predetermined safe value for the pair of electric valves.

4. In a control system for regulating the feeding of an electrode for producing and maintaining an electric arc, the combination comprising, a motor disposed for raising and lowering the electrode, a plurality of pairs of electric valves disposed to selectively connect the motor to a source of alternating current to control the direction of operation of the motor, the electric valves of operation of the motor, the electric valves having grids to be utilized for controlling the conductivity thereof, a grid control circuit including a resistor for each pair of the electric valves, a discharge valve having a control grid therein to be utilized for controlling the flow of direct current through the resistor for controlling the bias of the grids of the pair of electric valves associated therewith, a pair of sources of control voltages variable in opposite senses in response to electrical conditions of the arc for impressing predetermined biases on the grids of the discharge valves, and a pair of control resistors, each of the control resistors being connected in circuit relation with the motor, source of control voltage and discharge valve associated with a pair of the electric valves, each of the control resistors being responsive to the flow of motor current of a predetermined value to control the bias of an associated discharge valve and the pair of electric valves controlled thereby to maintain the flow of current to the motor at a safe value for the pair of electric valves.

5. In a control system for regulating the feeding of an electrode for producing and maintaining an electric arc, the combination comprising, a motor disposed for reversible operation, a plurality of pairs of rectifiers electrically connected to provide a plurality of pairs of sources of control voltages, each pair of sources of control voltages being variable in opposite senses, a pair of discharge valves connected to a source of electrical energy, each of the discharge valves having a grid connected in circuit with a pair of the sources of control voltage, the pair of sources thereby normally controlling the conductivity of the discharge valve connected in circuit therewith, a plurality of pairs of electric valves disposed to selectively connect the motor to a source of alternating current to control the speed and direction of operation of the motor, each of the discharge valves being connected in circuit relation to an associated pair of the electric valves to control the conductivity thereof, and a pair of control resistors, each of the control resistors being connected in circuit relation with the motor, a discharge valve and a pair of the sources of control voltage, each of the control resistors being responsive to the flow of motor current of a predetermined value to control the bias of an associated discharge valve and the pair of electric valves controlled thereby to maintain the flow of current to the motor at a safe value for the pair of electric valves.

JACK E. REILLY.

REFERENCES CITED

The following references are of record in the file of this patent:

UNITED STATES PATENTS

| Number | Name | Date |
| --- | --- | --- |
| 2,259,958 | Levy | Oct. 21, 1941 |
| 2,329,127 | Levy | Sept. 7, 1945 |